Aug. 28, 1962
D. W. PIERCE ET AL
3,050,857
SYSTEM FOR MEASURING THE LENGTH OF ROLLING-MILL PRODUCT
Filed Dec. 27, 1960
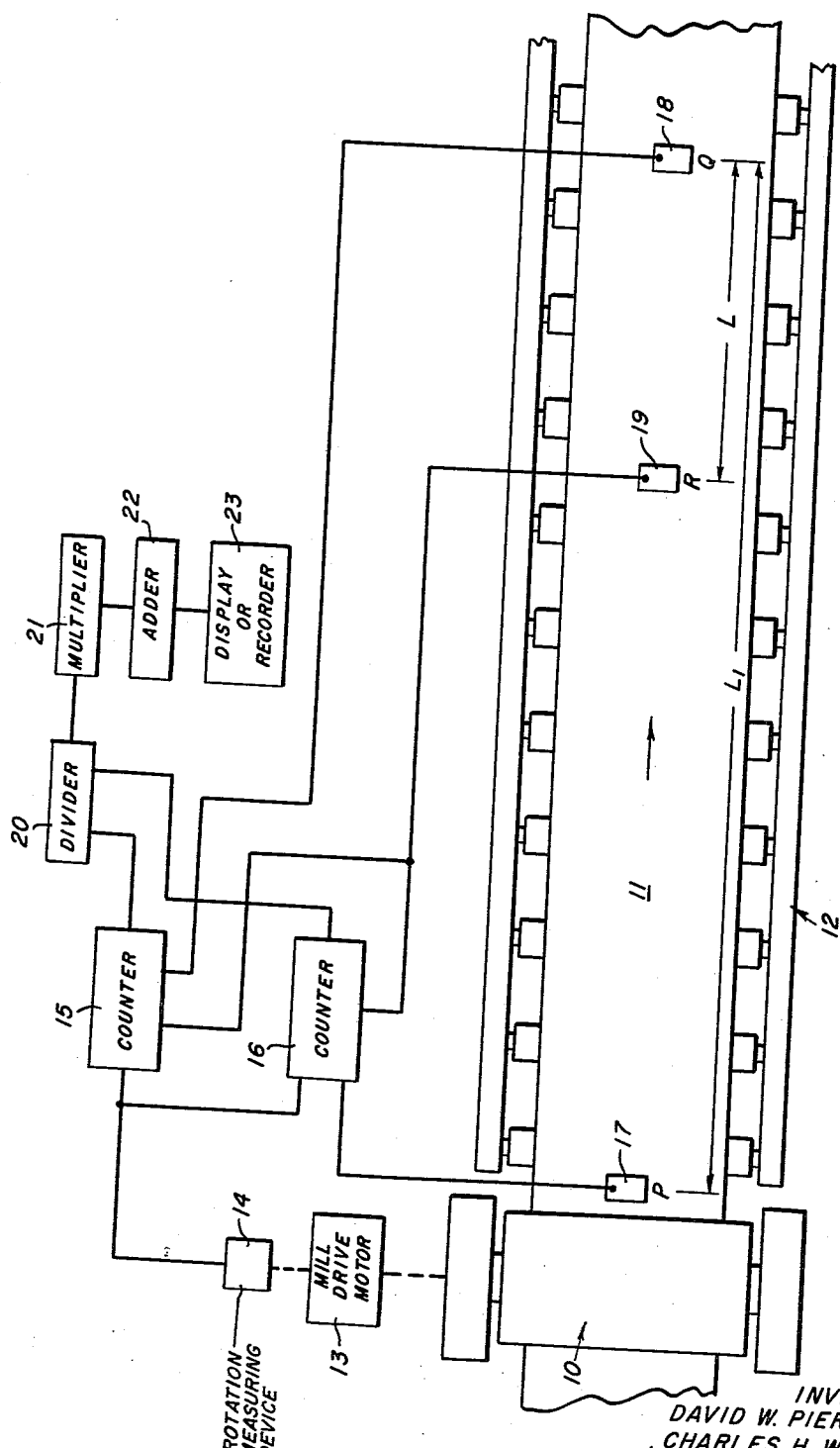
INVENTORS
DAVID W. PIERCE and
CHARLES H. WEXLER
By Donald G. Dalton
Attorney 3,050,857
SYSTEM FOR MEASURING THE LENGTH OF ROLLING-MILL PRODUCT
David W. Pierce, Flossmoor, Ill., and Charles H. Wexler, Pittsburgh, Pa., assignors to United States Steel Corporation, a corporation of New Jersey
Filed Dec. 27, 1960, Ser. No. 78,616
5 Claims. (Cl. 33—141)

This invention relates to a length-measuring system and, in particular, to a system for measuring the length of a rolling-mill product such as a steel billet or structural shape as it emerges from the last stand of the mill.

For economical utilization of rolled steel product which has to be cut to standard or ordered lengths, it is desirable for the shear operator to know the total length available in any given piece as it emerges from the mill. This length will vary from piece to piece because of variations in the cropping of the ingots from which the pieces are rolled. Several schemes have been proposed for determining the length of a rolled product issuing from a mill but none of those known to us is very satisfactory. Contact measuring wheels, for example cannot be used for hot-rolled products because of the effect of temperature and abrasion on the wheels.

We have invented a system which permits accurate and quick determination of the length of a hot-rolled member as it comes out of the last stand of the mill in which it is rolled. Our system measures the total angular movement of the mill rolls while the workpiece is in contact therewith. From this figure, and the size of the rolls, the length could be easily computed except for the slippage which occurs between the rolls and workpiece when the latter enters the mill stand. Our system makes allowance for such slippage in order to obtain an accurate measurement.

A complete understanding of the invention may be obtained from the following detailed description and explanation which refer to the accompanying drawing, the single FIGURE of which is a circuit diagram illustrating our system, showing a stand of a mill and a delivery table in plan.

Referring now in detail to the drawing, the last stand 10 of a rolling mill delivers hot-rolled product 11 such as a steel billet or structural shape onto a run-out roller table 12, in a length several times that in which the product is ordinarily used. An H-beam, for example, used in length of from 15' to 40' may be rolled in a length of 85'. Accurate knowledge of the total length of a piece as rolled obviously permits better advantage to be taken in cutting it to various standard or other specially ordered lengths.

Stand 10 is driven, through usual intermediaries, by its own motor 13. A digital device 14 such as a tachometer measures the angular rotation of the motor and the mill. The device may be model DY-2504 or Model 608E made by Hewlett-Packard Co., Palo Alto, California. The device, because of the reduction gearing between the motor and mill rolls (not shown), will deliver an output pulse of electric voltage for every one-third of a degree of rotation by the rolls. The pulses delivered by the device are applied by conventional circuits, indicated by connecting lines, to each of two electronic counters 15 and 16. These may be model 111-B counters made by Navigation Computer Corp., Philadelphia, Pa. The counters operate when started, to accumulate the number of pulses received from device 14, and this number remains on the counter when it is stopped after a period of operation, until it is cleared. The counters have conventional starting and stopping circuits, as will be explained later. Operation of counters 15 and 16 is controlled by radiation-sensitive relays or detectors 17, 18 and 19 spaced apart along table 12 and successively subject to the visible or infra-red radiation from workpiece 11 as it advances. These detectors may be photoelectric or photoconductive cells such as the lead-sulfide cell, type N-2 of Eastman Kodak Co., Rochester, New York; the silicon cell, type 2A of Hoffman Electronics Corp., El Monte, California; or type 6957 cell of Radio Corporation of America, Harrison, New Jersey. Relay 17 is located as closely as possible to the roll bite of stand 10. Relay 18 is located a distance $L_1$ down the length of table 12. This distance is as large as possible without exceeding the minimum length of product being rolled. For example, where product length may vary from 90' to 225', $L_1$ should be about 65'. Relay 19 is located ahead of relay 18 by an integral number of feet, say twenty. All the relays 17, 18 and 19 should have a narrow field of view in the direction of product travel so they will be activated or deactivated at the exact time of the passage of the leading or trailing end of piece 11.

Relays 17, 18 and 19 are aimed, respectively, at points P, Q and R spaced along table 12. Relay 19 is diagrammatically shown connected to the starting circuits of counters 15 and 16 and serves to start them when the leading end of piece 11 reaches point R and activates the relay. Similarly, detector 18 is connected to the stopping circuit of counter 15 and operates to stop it when the leading end of the piece reaches point Q. This leaves on counter 15, a number $N_{15}$ which corresponds to a 20' length of the piece. Relay 17 is connected to the stopping circuit of counter 16 and serves to stop it when the trailing end of the piece reaches point P. As a result, the number $N_{16}$ left on counter 16 corresponds to the total length of the piece less $L_1-L$ and the total length $L_c$ may thus be obtained from the formula:

$$L_c = L\frac{N_{16}}{N_{15}} + (L_1 - L)$$

The value of $L_c$ may be obtained in any convenient way, e.g., by a hand calculation or automatic means.

Application of the pulses to the counters is actually controlled conventionally. That is to say, these pulses affect the counters under the control of known gating circuits which normally prevent counter actuation until a signal is received from one of detectors 17, 18 and 19. Thereafter impulses are accumulated by the counters until a second detector signal is received which again blocks off the counters from the tachometer pulses.

We also provide apparatus for solving the above formula for each piece 11 as it is being delivered onto table 12. This apparatus includes a divider 20, a multiplier 21 and an adder 22. These units are of known type and may be assembled from standard digital circuit modules such as Series 300 of Navigation Computer Corporation or Series M of Computer Control Co., Inc., Framingham, Massachusetts. Divider receives the output of counters 15 and 16 and delivers a quotient $$\left(\frac{N_{16}}{N_{15}}\right)$$

to multiplier 21 which applies the factor L. To the result of this multiplication, unit 22 adds the constant $(L_1-L)$. The final result may be displayed visually or recorded on a conventional unit 23 such as model 8360 display unit or Model 1452 printer, both made by Berkeley Division, Beckman Instruments Company, Richmond, California. The connections between units 20, 21, 22 and 23 are indicated diagramamtically by single lines. After the result of the measurement has been observed or recorded for the guidance of the shearman, the piece moves on to the shear and counters 15 and 16 and the other units may be cleared by conventional means whereupon the system is ready for the next operation.

Any slippage between the mill rolls 10 and workpiece 11 as the latter enters the mill stand, is confined to the first 10' or 20' of the length of the piece. Our invention avoids errors which might be introduced by such slippage because operation of counters 15 and 16 is started only after a much greater length of the piece, say 65', has traversed the mill. Thereafter the rotation of the rolls is a true measure of the length of piece passing therethrough.

Although we have disclosed herein the preferred embodiment or our invention, we intend to cover as well any change or modification therein which may be made without departing from the spirit and scope of the invention.

We claim:

1. A system for determining the length of a hot-rolled workpiece as it issues from a rolling mill comprising a rotation measuring device connected to be driven at a speed proportional to that of the mill, two independent means for accumulating the output of the device, means responsive to arrival of the leading end of the piece at a predetermined point beyond the mill effective to start both said accumulating means, a second means responsive to the arrival of said leading end at a point spaced a predetermined distance from said first mentioned point effective to stop one of said accumulating means and means responsive to the emergence of the trailing end of the piece from the mill to stop the other accumulating means.

2. A system as defined in claim 1, characterized by said device being a digital tachometer.

3. A system as defined in claim 1, characterized by said device being a pulse generator.

4. A system as defined in claim 1, characterized by said accumulating means being electronic counters.

5. A system as defined in claim 1, characterized by said means responsive to the arrival of the leading end of the piece and said means responsive to the emergence of the trailing end of the piece from the mill being radiation-actuated relays subject to energy radiated from the piece.

No references cited.

UNITED STATES PATENT OFFICE
CERTIFICATE OF CORRECTION

Patent No. 3,050,857            August 28, 1962

David W. Pierce et al.

It is hereby certified that error appears in the above numbered patent requiring correction and that the said Letters Patent should read as corrected below.

Column 1, line 48, for "length", first occurrence, read -- lengths --; column 2, line 47, strike out "tachometer"; line 55, after "Divider" insert -- 20 --.

Signed and sealed this 11th day of December 1962.

(SEAL)
Attest:

ERNEST W. SWIDER
Attesting Officer

DAVID L. LADD
Commissioner of Patents